June 10, 1947.         R. O. LUNDBERG         2,422,111
CUTOFF SAW
Filed Nov. 8, 1945
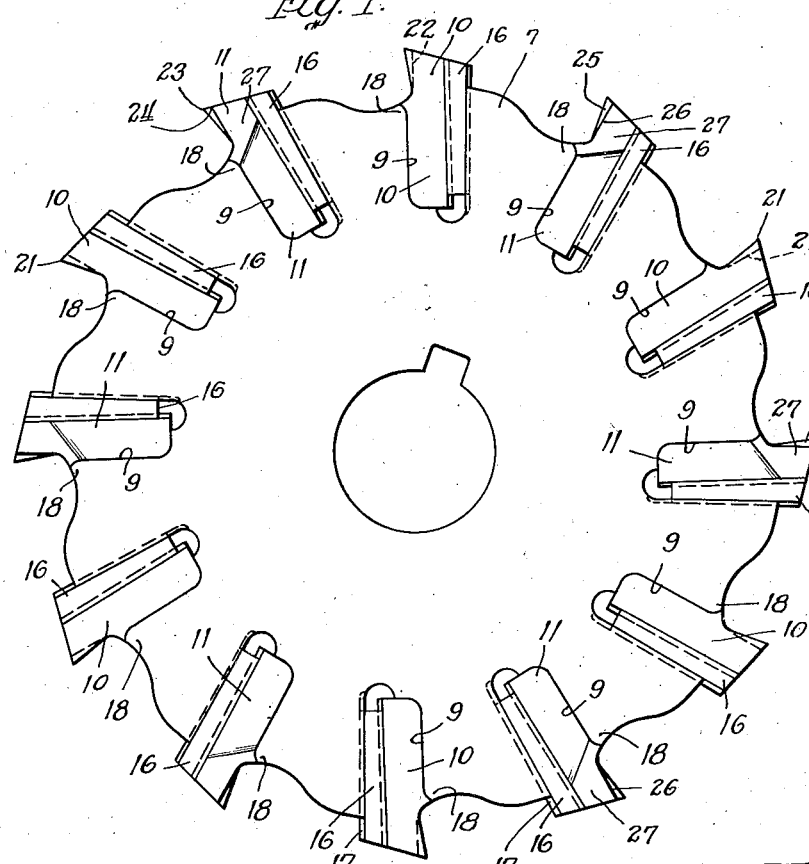
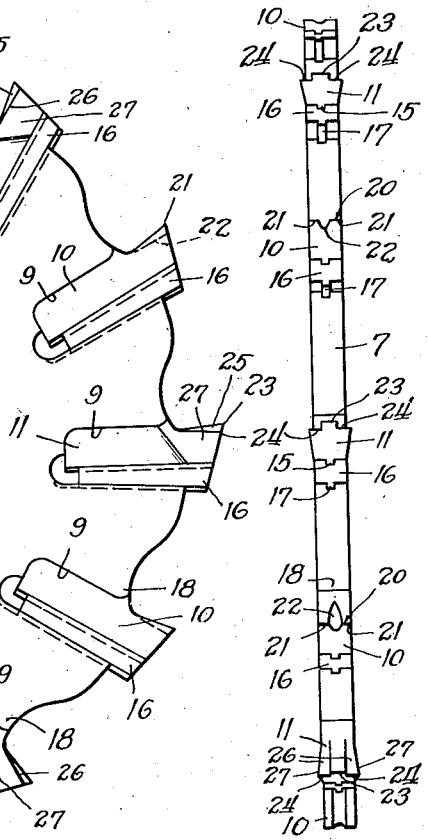
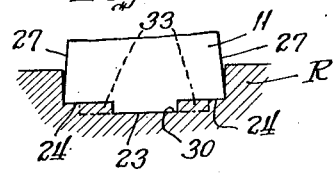
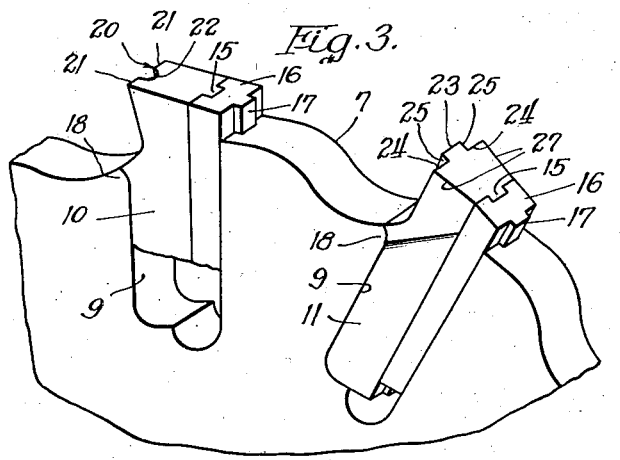
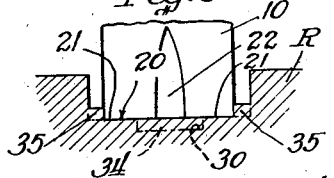
Inventor:
Roland O. Lundberg
By
Attys.

Patented June 10, 1947

2,422,111

UNITED STATES PATENT OFFICE 2,422,111

CUTOFF SAW

Roland O. Lundberg, Chicago, Ill.

Application November 8, 1945, Serial No. 627,452

2 Claims. (Cl. 29—105)

My present invention relates to improvements in cutoff saws, and more particularly to cutoff saws of the type having a plurality of removable teeth or blades carried by a saw disc.

In the art of metal cutting such as in the cutting of steel rails considerable difficulty has been encountered in providing a satisfactory and efficient cutoff saw. Early forms of such cutoff saws usually were provided with removable teeth or blades of the width desired to be cut and with the cutting edges spaced the same distance from the center or axis of the supporting saw disc. These forms of cutoff saws are not satisfactory for each tooth or blade cuts a chip equal to its full width requiring considerable force to drive the teeth through the metal being cut, and in addition the chips being of the same width as the slot or kerf being cut are not easily removed. Further, in these forms of cutoff saws, the corners of the cutting edges are subject to the greatest wear and heat and in most instances fail while the central portions of the cutting edges of the blades are still fit for further use. Various approaches have been made to avoid these disadvantages, and it has been proposed to cut grooves or gaps in the cutting edges of the blades or teeth with the grooves or gaps in alternate blades being arranged in offset relation whereby each blade is effective to cut at least two chips each of less width than the width of the groove or kerf being cut but of the same depth. Another approach to the problem has been to provide alternate wide and narrow cutting teeth with the wider teeth being effective to cut out the corner edges of the slot being cut. These forms of devices, however, do not satisfactorily solve the problem in that the cutting edges of the individual teeth cut to the same depth, and even though at least two chips are cut by each tooth difficulty is encountered in the removal of the chips. The present approach to this problem in the art has been to resort to the provision of two series of alternate wide and narrow blades with the narrow blades being of greater radial length so that the cutting edges thereof project beyond the cutting edges of the wide blades. With this arrangement the alternate blades cut at different depths and are effective to break up the chips for easy removal from the slot being cut. The objection to this approach to the problem lies in the difficulty encountered in sharpening the saw. Since the cutting edges of the two series of blades are at different distances from the center of the saw body separate settings of a grinding wheel and supporting fixture are necessary in the sharpening of the alternate series of blades which is objectionable from the standpoint of requiring the expenditure of considerable time in the sharpening and dressing of the saw.

It is an object of my invention to provide a cutoff saw which avoids the above noted objections of prior art devices, and in which the cutting blades or teeth will have a longer life than presently known forms of cutoff saws and the like.

A further object of my invention is to provide a cutoff saw having alternate wide and narrow teeth or blades, in which the teeth or blades each have cutting edges effective to cut more than a single chip with certain of the teeth having cutting edges for cutting at different depths.

A still further object is to provide a cutoff saw as aforesaid in which the series of wider teeth or blades having corner cutting edges for cutting the metal out of the corners of the slot or kerf being cut which are disposed inwardly of a cutting edge therefor for cutting metal centrally of the slot or kerf being cut.

A still further object is to provide a cutoff saw, as last aforesaid, in which a second series of alternate narrower blades are provided with a cutting edge for cutting the metal to either side of the central cutting edge portion of the wider series of alternate blades and short of the corners of the slot, which corners are adapted to be removed by the inwardly disposed cutting edges of the series of wider teeth or blades.

A still further object of my invention is to provide a cutoff saw, as aforesaid, in which both the narrow and wide blades may be sharpened with a single setting of a sharpening device.

In order to accomplish the aforesaid objects, I propose to provide a cutoff saw comprising a plurality of removable teeth suitably supported in known manner in a saw disc or body in which the teeth comprise alternate series of narrow and wide teeth with the wide teeth being determinative of the width of the slot or kerf to be cut. In the preferred embodiment of my invention the narrow blades are provided with a central groove which is effective to form two cutting edges at the same distance from the center of the saw disc body. The wide blades are preferably provided with a center rib or projection the outer edges of which form cutting edges with these edges lying at the same distance from the center of the saw disk as the pair of cutting edges of the narrow blades. The wide blades are each further formed with a pair of cutting edges one to either side of the cutting edge at the outer edge of the rib with the arrangement being such that the pair of cutting edges lie inwardly of the cutting edge of the rib or closer to the center or axis of the saw disc body than the cutting edges of the narrow teeth and the cutting edge of the rib of the wide teeth. With this arrangement of the cutting edges of the two series of narrow and wide blades the narrow blades will cut two chips at the same depth, and the wide blades will cut three chips, one of the same depth as the two chips cut by the narrow teeth, and two chips of lesser depth at the corners of the slot. Thus the corner cutting edges of the wide teeth or blades have a relatively small load imposed upon them whereby the life of these cutting edges are greatly enhanced. In addition the different cutting depths of the cutting edges facilitate the easy removal of the chips which further adds to the life of the several cutting edges.

Thus in the preferred embodiment of my invention it will be observed that the central cutting edge of the wide teeth and the pair of cutting edges of the narrow teeth all lie at the same distance from the center or axis of the saw disc body, with the wide teeth having corner cutting edges extending inwardly of the central cutting edge thereof and with the cutting edges of the wide teeth being arranged so that all of the cutting edges of both wide and narrow teeth may be sharpened at a single setting of a grinding wheel with respect to the cutoff saw. This is an important advantage of my invention in that a considerable saving of time is effected in the sharpening of my cutoff saw over the saws of the prior art.

Further objects and advantages of my invention will appear from the detail description.

Now, in order to acquaint those skilled in the art with the manner of constructing and utilizing cutoff saws in accordance with my invention, I shall describe in connection with the accompanying drawing a preferred embodiment of my invention.

In the drawing:

Figure 1 is a side elevational view of a preferred embodiment of a cutoff saw constructed in accordance with my invention;

Figure 2 is an end elevational view of the cutoff saw of Figure 1;

Figure 3 is a detail perspective view of a segment of the cutoff saw of Figure 1 showing the two forms of teeth or blades of my invention;

Figure 4 is a diagrammatic profile view of the wide cutting tooth or blade of my invention and showing in broken lines the cut that will be made by the following narrow tooth or blade; and Figure 5 is a profile view of the narrow cutting blade of my invention and showing in broken lines the cut that will be made by following wide tooth or blade of Figure 4.

Referring now to the drawing it will be observed that the cutoff saw of the embodiment of my invention herein disclosed comprises a disc saw body 7 which is provided with a plurality of circumferentially spaced slots 9 extending inwardly of the saw disc body 7. A first series of narrow cutting blades or teeth 10, all of like construction, are adapted to be disposed in alternate slots 9 of the disc body. A second series of wide cutting teeth or blades 11 are disposed in the other alternate slots 9 of the saw body 1 so that the teeth 10 and 11 of the two series of teeth or blades are supported in alternate relation with respect to each other in the disc body. Each of the teeth or blades 10 and 11 has its outer face or heel surface disposed obliquely to provide for clearance therebetween and the metal being cut. As shown more clearly in Figure 3, the teeth or blades 10 and 11 are each formed with a tenon or rib 15 fitting into a mortise or groove in a key member 16 which is also provided with tenon 17 fitting into a mortise formed in the disc body in the trailing edge of each of the slots 9 to provide for removably supporting the teeth 10 and 11 in the slots 9. It will also be observed that the slots 9 at the upper leading edges thereof are provided with abutments 18 adapted to have engagement with the forward edges of the blades 10 and 11 for positioning the blades in the same relative positions in the several slots 9 with respect to the center of the saw disc body 7 or the axis of rotation thereof.

It will be clear from Figures 2, 4 and 5 that the series of teeth 10 are narrower than the series of teeth 11 and that the leading cutting edges 20 of each of the narrow teeth are formed into a pair of cutting edges 21—21 by a groove 22 lying substantially in the median vertical plane of the saw so that each of the teeth 10 provide two cutting edges adapted to cut metal to either side of the vertical median plane of the saw and in which the pair of cutting edges 21—21 are spaced the same distance from the center or axis of the saw. The wide teeth 11 comprise a plurality of cutting edges 23 and 24—24 which cutting edges 23 are disposed centrally of the teeth 11 and being adapted to cut metal to either side of the vertical median plane of the saw with the cutting edges 23 being in alignment with the grooves 22 of the narrow blades 10. The cutting edge 23 of the central projection or rib 25 of the wide blades lie the same distance from the axis or center of the saw disc body as the pair of cutting edges 21—21 of the narrow blades 10. A pair of second cutting edges 24—24 are formed at the intersections of surfaces 27—27 laterally of the rib or projection 25 with the heel surfaces of the wide blades 11. It will be observed that the cutting edges 24—24 are disposed more closely to the axis of the saw disc body 7 than the cutting edges 23 of the wide teeth and the cutting edges 21—21 of the narrow blades. Thus the pair of cutting edges 24—24 disposed at either side of the leading forward central cutting edges 23 of the wide teeth will cut to a lesser depth than the central cutting edge 23 when a given wide tooth 11 is in cutting position.

Referring now to Figures 4 and 5, I shall describe the manner in which the cutoff saw of my present invention operates in cutting a metal object such as a steel rail. In Figure 4, I have indicated the profile of one of the wide cutting teeth 11 from which it will be observed that the central cutting edge 23 thereof is adapted to cut a central groove or slot 30, and in which the inwardly disposed cutting edges 24—24 are cutting or cleaning out the corner portions of the slot being cut in the object R. The cutting edges 24—24 determine the width of the slot being cut by the saw. In Figure 4 I have indicated in broken lines the cut which will be made in the object R by the succeeding narrow tooth 10 the profile of which is shown in Figure 5, and in which it will be observed when it enters the slot being cut in the object R cuts out the broken line dotted portions of Figure 4. In Figure 5 I have indicated in broken lines the metal which will be removed by the next succeeding wide tooth from which it will be clear that the central cutting edge 23 is effective to form the slots 30 in the object R and that the cutting edges 24 clear out the corner edges of the slot being cut in the object R.

It will thus be observed that the narrow blade 10 of Figure 5 is adapted to cut the two chips of equal dimension as indicated at 33—33 in Figure 4. It will also be observed from Figure 5 that the central cutting edge 23 of the wide blades 11 are adapted to cut a chip 34 centrally of the slot being cut, and that the cutting edges 24—24 are adapted to cut chips 35—35 from the corners of the slot being cut in the object R. Thus, assuming that the first blade to bite into the object being cut is a narrow blade 10, it will be seen that it will cut two chips of the profile outline indicated at 33—33 and the subsequent following wide tooth 11 will cut three chips shown at 34 and 35—35 with the chip 34 being cut further inwardly of the object R than the corner chips 35—35. The wide blade is thus effective to cut three chips two at a lesser depth than the intermediate chip cut by the central cutting edge 23, and that the narrow blades are adapted to cut two chips at the same depth. Thus, the cutoff saw of my invention is adapted upon engagement of successive wide and narrow teeth to cut five chips in which certain of the chips cut by the wide teeth are at different levels which is effective to provide for the ready removal of the chips from the object being cut. With the arrangement of the corner cutting edges 24—24 to either side of the central cutting edge 23 of the wide blade the corner cutting edges are subject only to a small load when cutting a slot or kerf in a metal object whereby the life of all the several cutting edges of the narrow and wide blades is greatly enhanced.

As previously related a particularly preferred feature of my invention is in the provision of alternate narrow and wide blades or teeth arranged as above described so that all of the blades may be ground with a single setting of a grinding wheel and fixture for holding the saw disc 7. It will be observed that the oblique heel surfaces of the narrow and wide cutting teeth or blades are all disposed in the same relation with respect to the center or axis of the saw disc body 7 whereby all of the blades may be sharpened with a single setting of the sharpening equipment. The oblique heel surface of the wide teeth, together with the projection 25 thereof, is effective for forming cutting edges for the wide blades at different distances from the center or axis of the saw disc body to achieve the aforesaid cutting of five chips by successive narrow and wide blades and the easy removal thereof from the object being cut.

While I have shown what I consider to be the preferred embodiment of my invention it will be understood that various modifications and rearrangements may be made therein without departing from the spirit and scope of my invention.

I claim:

1. In a cutoff saw having a saw body the combination of alternate wide and narrow teeth projecting from an edge of said saw body, said narrow teeth having their cutting edges interrupted by a groove to provide a pair of cutting edges spaced the same distance from said saw body, said wide teeth having a plurality of cutting edges with one of said cutting edges of each thereof spaced the same distance from the saw body as the pair of cutting edges of said narrow teeth and positioned in alignment with the groove in the latter, and said wide teeth each having second cutting edges disposed to either side of said one cutting edge thereof with said second cutting edges being spaced inwardly of said one cutting edge thereof.

2. In a cutoff saw having a saw body the combination of alternate wide and narrow teeth projecting from an edge of said saw body, said narrow teeth having their cutting edges interrupted by a groove centrally thereof to provide a pair of cutting edges spaced the same distance from said saw body, said wide teeth having three cutting edges with one of said cutting edges being disposed centrally thereof in alignment with the grooves of said narrow teeth and spaced the same distance from said saw body as said pair of cutting edges of said narrow teeth, and the other of said cutting edges of said wide teeth being disposed one to either side of said one cutting edge thereof and being spaced closer to said saw body than said one cutting edge thereof.

ROLAND O. LUNDBERG.

REFERENCES CITED

The following references are of record in the file of this patent:

UNITED STATES PATENTS

| Number | Name | Date |
|---|---|---|
| 889,829 | Valentine et al. | June 2, 1908 |
| 543,608 | Beale | July 30, 1895 |
| 772,154 | Juengst | Oct. 11, 1904 |
| 830,779 | Geer | Sept. 11, 1906 |
| 1,037,146 | Hunter | Aug. 27, 1912 |
| 1,125,102 | Huther | Jan. 19, 1915 |